United States Patent
Bray et al.

(10) Patent No.: US 6,865,460 B2
(45) Date of Patent: Mar. 8, 2005

(54) COMMUNICATION NETWORK FOR AN AUTOMOBILE

(75) Inventors: Thomas J. Bray, Saline, MI (US); Paul Allen Berneis, Dexter, MI (US); Borys Joseph Melnyk, Allen Park, MI (US); Jeff Matson, White Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 191 days.

(21) Appl. No.: 10/278,542

(22) Filed: Oct. 23, 2002

(65) Prior Publication Data

US 2003/0080619 A1 May 1, 2003

Related U.S. Application Data

(60) Provisional application No. 60/341,101, filed on Oct. 29, 2001.

(51) Int. Cl.[7] .................................................. G06F 7/00
(52) U.S. Cl. .......................... 701/36; 701/33; 340/438; 340/439
(58) Field of Search .............................. 701/1, 33, 36; 340/425.5, 438, 439; 700/83

(56) References Cited

U.S. PATENT DOCUMENTS

| | | | |
|---|---|---|---|
| 5,293,375 A | | 3/1994 | Moorwood et al. |
| 5,650,929 A | * | 7/1997 | Potter et al. .............. 455/456.1 |
| 5,957,985 A | | 9/1999 | Wong et al. ................... 701/33 |
| 5,995,512 A | | 11/1999 | Pogue, Jr. |
| 6,005,414 A | * | 12/1999 | Reay ............................. 326/83 |
| 6,023,232 A | | 2/2000 | Eitzenberger ................ 340/988 |
| 6,161,006 A | * | 12/2000 | Balachandran ............... 455/410 |
| 6,161,066 A | | 12/2000 | Wright et al. .................. 701/36 |
| 6,185,491 B1 | | 2/2001 | Gray et al. ..................... 701/36 |
| 6,198,996 B1 | | 3/2001 | Berstis ........................ 701/36 |
| 6,253,122 B1 | | 6/2001 | Razavi et al. .................. 701/1 |
| 6,362,730 B2 | | 3/2002 | Razavi et al. ............... 340/438 |
| 6,370,449 B1 | | 4/2002 | Razavi et al. ................... 701/1 |
| 6,377,860 B1 | | 4/2002 | Gray et al. .................... 700/83 |
| 6,502,019 B1 | * | 12/2002 | Zydek et al. .................. 701/29 |
| 6,608,399 B2 | * | 8/2003 | McConnell et al. ......... 307/10.1 |
| 6,697,719 B2 | * | 2/2004 | Stouffer et al. ................ 701/36 |
| 2001/0033225 A1 | | 10/2001 | Razavi et al. ............ 340/425.5 |
| 2001/0041956 A1 | | 11/2001 | Wong et al. ................... 701/36 |

FOREIGN PATENT DOCUMENTS

JP    2000 322780 A    11/2000

* cited by examiner

*Primary Examiner*—Gertrude A. Jeanglaude
(74) *Attorney, Agent, or Firm*—Brinks Hofer Gilson & Lione

(57) ABSTRACT

A "segmented" CAN bus is provided that extends the cabling scheme of a CAN network to permit isolation of individual nodes of identical type when needed and the ability for a host to determine the network topology. In addition, the CAN bus cabling scheme automatically assigns unique addresses to nodes and guarantees that the network will always be properly terminated. This eliminates the need for jumpers, DIP switches, pre-installation programming, or other hardware requiring human intervention to uniquely identify the nodes on the network. Furthermore, because the physical node topology is determinable, equipment installation and anomaly diagnostics are facilitated.

35 Claims, 5 Drawing Sheets

COMMUNICATION NETWORK FOR AN AUTOMOBILE

CROSS-REFERENCE TO RELATED APPLICATIONS

The present invention claims priority to U.S. Provisional Ser. No. 60/341,101, filed on Oct. 29, 2001 and entitled "Communication Network For An Automobile."

TECHNICAL FIELD

The present invention relates to systems and methods for communicating control and data signals to and from various appliances in an automobile.

BACKGROUND

Conventional embedded systems are designed to control a wide variety of equipment, where the customer (not the system vendor) has the responsibility of choosing the equipment, connecting the equipment to the system, and making the system work. When such a system is delivered to large numbers of end users (many thousands) it becomes necessary for the system to be easily configured and to be error-proofed against mistakes made by the customer. Complicating the problem, the variety of equipment in the field is large and the vendor of each piece of equipment determines its properties and its interfaces. A solution must accommodate such variability, including differences in the electrical interfaces and the higher-level protocols, while still providing a system that is easily configured by the customer.

In most local area networks, nodes have IDs that can identify the physical nodes (e.g., their addresses), however there is no way for a node to determine the physical node topology. In some local area networks (e.g., those using CAN), nodes do not even have a physical address. When a node cannot determine the physical node topology, in the event of an anomaly it is extremely difficult for a technician to diagnose and locate the malfunctioning piece of equipment. In order to facilitate equipment installation and provide meaningful diagnostics to technicians and users, a means of providing a node with the physical node topology is desirable.

While most local networks have a forced topology of a star or a bus, either of these network topologies can cause cable routing difficulties. An automobile usually has a concentration of equipment in the trunk with additional equipment located throughout the vehicle. Employing a network with a star topology necessitates routing many individual cables from a hub to each piece of equipment, resulting in the use of longer cables than are necessary for components that are often located adjacent to one another. Employing a network with a bus topology necessitates routing a single CAN network cable throughout the vehicle, resulting in the difficult task of optimizing the route of one cable throughout the entire automobile. Moreover, employing a single CAN network cable increases both the possibility of a single point failure of the network and the impact of such a failure should one occur. Accordingly, there is a need for a means of reducing the cable routing difficulties of the customer while improving the reliability of the entire network.

Related U.S. Pat. No. 6,161,066 assigned to Wright et al. (Wright) describes a vehicle-based control system that employs a multiple control unit architecture. However, as disclosed by Wright, the entire control system will fail should the IDB fail because no piece of equipment will be controllable by the realtime microcontroller. U.S. patent application U.S. 2001/0041956 A1 assigned to Wong et al. (Wong) describes an automobile information system. Wong discloses an automobile information system that facilitates communication within clusters of components and among various clusters. However, similar to Wright, if the primary bus fails then the entire automobile information system fails. Therefore there is a need to eliminate the possibility of a single point failure of an entire vehicle network due to a single cable failure.

As a result of the aforementioned problems, there is a need for a new and improved communication network for use in an automobile. The new and improved communication network should address and overcome the problems as outlined above.

BRIEF SUMMARY

In an embodiment of the present invention, a "segmented" CAN bus extends the cabling scheme of a CAN network to permit isolation of individual nodes of identical type when needed and the ability for a host to determine the network topology. In addition, the cabling scheme automatically assigns unique addresses to nodes and guarantees that the network will always be properly terminated. This eliminates the need for jumpers, DIP switches, pre-installation programming, or other hardware means requiring human intervention to uniquely identify the nodes on the network. Furthermore, because the physical node topology is determinable, equipment installation and anomaly diagnostics are facilitated. The present invention contemplates that this technique can be applied to most local area networking schemes.

The system supports a consistent set of messages for appliances of each type, regardless of the make/model of the appliance or of the individual interface needs of the appliance. The appliance's interface needs are encapsulated into devices called interface modules (IMs), which provide the translation between the network/system message set and the individual appliance. This makes it possible to add new appliances with their own characteristics to the system by creating a new IM tailored to the device. The system will accept the new device without any changes to the core system.

The network specifications and system message set will be public, so that appliance manufacturers can incorporate the IM into their appliances and eliminate the need for a separate device if desired.

Each IM knows the type of device it supports, making it possible for the system to verify that its configuration matches the control tables in the system and to allow the system to correct discrepancies that are found.

Some IMs will support a variety of devices using the same underlying hardware. They will change their behavior to match specific devices by having configuration information installed in flash memory. The information will largely be data, not code, and is interpreted by an engine running in the IM.

A configuration utility will generate the control tables for the system, including any configuration information that needs to be flashed into any of the network nodes. The configuration utility will combine the hardware layout with customer preferences to generate a control strategy (set of configuration data) for each of the nodes in the system.

DETAILED DESCRIPTION

Figure 1:
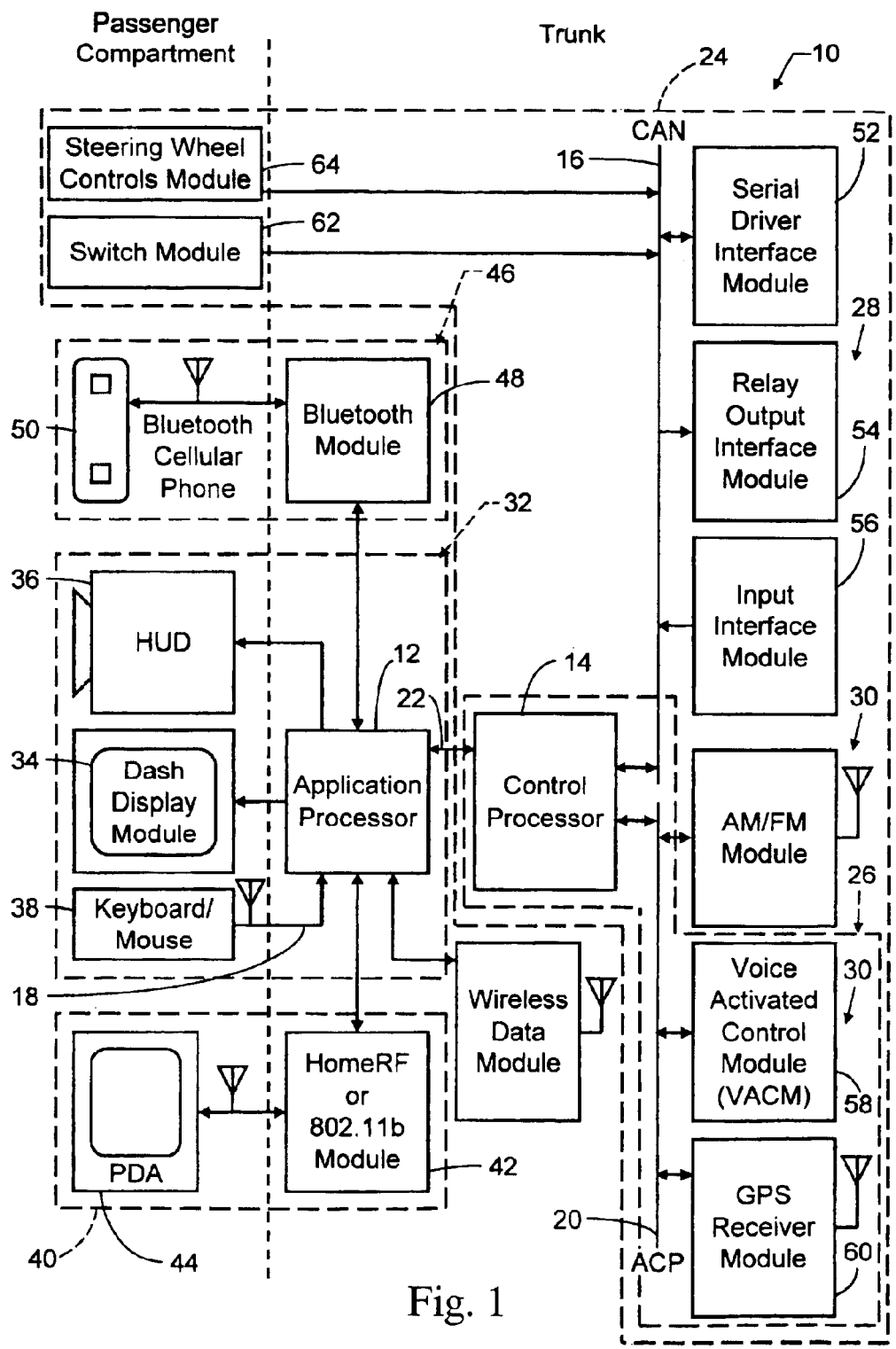
FIG. 1 is a block diagram illustrating a system for controlling a plurality of electronic devices in an automobile, in accordance with the present invention.

With reference to FIG. 1, a system 10 for controlling a plurality of electronic devices in an automobile is illustrated, in accordance with the present invention. The system 10 will be described with reference to an emergency vehicle, such as a police vehicle, and with reference to police equipment. However, it is contemplated that the communication network of the present invention may be utilized in any environment and with any equipment.

In an embodiment of the present invention an architecture of system 10 referred to as "little boxes" architecture is provided. This architecture is a distributed architecture. Each "box" in the architecture performs a specific task (e.g., a display driver or voice recognition). For example, two of the boxes are processors: a Windows Application Processor (AP) 12 and an embedded Control Processor (CP) 14. Other boxes represent all of the attached equipment or appliances. The boxes or appliances are connected to the AP and CP via a Controller Area Network (CAN) bus 16, through standard PC interfaces 18 or via an ACP network 20. The AP 12 and CP 14 preferably communicate across a TCP/IP link 22. It is to be understood that this embodiment of the present invention does not include all equipment that may be included, nor does this embodiment limit the network to the appliances or connection options that are illustrated.

With continuing reference to FIG. 1, four sub-systems of system 10 are illustrated. A first sub-system, that will be referred to as core system 24, includes a master control box (MCB) 26, a plurality of equipment interface modules 28 that connect to the CAN bus 16, and modules 30 that connect through the ACP network 20. The core system 24 controls the police equipment and provides voice and critical function human machine Interfaces (HMIs). The core system 24 includes CP 14, which manages the core system 24. The CP 14 is packaged in the MCB 26, which also includes the voice activated control module (VACM) 58 and global positioning system receiver module (GPS) 60.

A sub-second system, that will be referred to as the windows sub-system 32, includes the application processor (AP) 12, a dash display module 34, a heads up display (HUD) 36, and a keyboard/mouse 38. Windows system 32 controls the Dash Display Module 34 and the HUD 36. Windows system 32 also runs user applications (e.g., ticket writing, AVL, and dispatch). In this role, windows system 32 receives global positioning system input and manages data communications.

A third sub-system, that will be referred to as a homeRF or 802.11b network 40, includes a homeRF or 802.11b module 42 that supports a Personal Digital Assistant (PDA) 44. The homeRF or 802.11b network 40 may also be used to transfer data to a central computer system when the vehicle is at a service site. The homeRF network or 802.11b network 40 is managed by the AP 12.

A fourth sub-system, that will be referred to as a bluetooth network 46, includes a bluetooth module 48 that will be used to support Bluetooth-enabled devices, such as a Bluetooth cellular phone 50.

In an embodiment of the present invention, core system 24 controls the police equipment in the vehicle by communicating control signals through CAN bus 16 to equipment interface modules 28, such as a serial driver interface module 52, a relay output interface module 54, and an input interface module 56. The core system 24 also includes equipment interface modules (IMs) 28 that provide input and output from the HMIs and also provide equipment control. Each IM provides a standard interface to CP 14.

Each IM 28 may be implemented in one of four ways: as standalone hardware, as hardware that interfaces directly to CP 14 rather than through a network, as software running on CP 14 (i.e., there is no actual separate hardware), or each IM may be built into the equipment being interfaced.

In an embodiment of the present invention, core system 24 has several HMI input devices, such as a switch module 62, a steering wheel controls module 64, a voice activated control module (VACM) 58, and a fingerprint reader (not shown). VACM 58 provides voice output for core system 24. Core system 24 receives HMI from the Dash Display Module 34 and the HUD 36. Core system 24 may have other HMI output devices, such as, but not limited to, LEDs or LCDs on the switch module for example.

The CP 14 keeps track of the status of the vehicle equipment, receives command messages from IMs 28, HUD 36 and dash display module 34 and sends control messages to equipment such as a light-bar, a siren, etc.

The steering wheel control module 64 comprises a set of switches mounted on a steering wheel. For example, a voice recognition button and navigation controls for a graphical user interface (GUI) are provided on the steering wheel. The steering wheel control module 64 further includes a push to talk (PTT) button for voice recognition applications. The steering wheel control module 64 connects to CAN network 16 via a steering wheel interface module (not shown), so that voice recognition can work independently of AP 12.

In an embodiment of the present invention a switch module 62 is provided. The switch module 62 comprises a small panel of switches mounted in the passenger compartment of the vehicle. The switch module 62 may be part of the main-display bezel for example. Preferably, the switch module 62 has a slide switch or the like for lights or a siren, knobs or switches to control a radio, and a panic button. If the switch module 62 is not part of the display bezel, it may also include a small LCD panel or LEDs for providing HMI feedback to a system operator.

The switch module 62 contains an integrated IM. CP 14 can interrogate switch module 62 over CAN bus 16 to determine the state of the switches. Switch module 62 is capable of sending messages or signals to CP 14 when the system's user changes any of the switches. Accordingly, the switch data module 62 provides robust HMI input (beyond the accuracy of voice recognition) and serves as a back-up HMI device that continues to operate if and when AP 12 and the GUI become inoperable. Switch module 62 also provides a tactile input device with which a system user may be more familiar, thereby improving the performance of the systems user during a crisis situation. The present invention contemplates the use of additional switch modules configured for additional equipment.

The architecture of the present invention assumes that all equipment connects to CP 14 through IMs. The IMs 52, 54, 56 provide a standard interface between CP 14 and the attached equipment. The IMs 52, 54, 56 for example translate commands into device specific controls transmitted from CP 14. Additionally, the IMs translate status messages and report information from the attached equipment and transmit the messages to CP 14. In order to minimize the number of module types, generic interface module designs are used when possible and are customized for the attached equipment having the IM's programmable memory. Preferably, EEPROMs are used for the programmable memory; alternatively, micro-controller flash memory may be used.

As previously disclosed, many of the IMs 52, 54, 56 in core system 24 connect to CP 14 via a CAN network. This system architecture prohibits the exchange of information between IMs 52, 54, 56 over the CAN network without involvement of the CP 14. Generally, communication occurs between CP 14 and an IM, with the CP 14 acting as a relay point for data messages that are intended for other IM.

Figure 2:
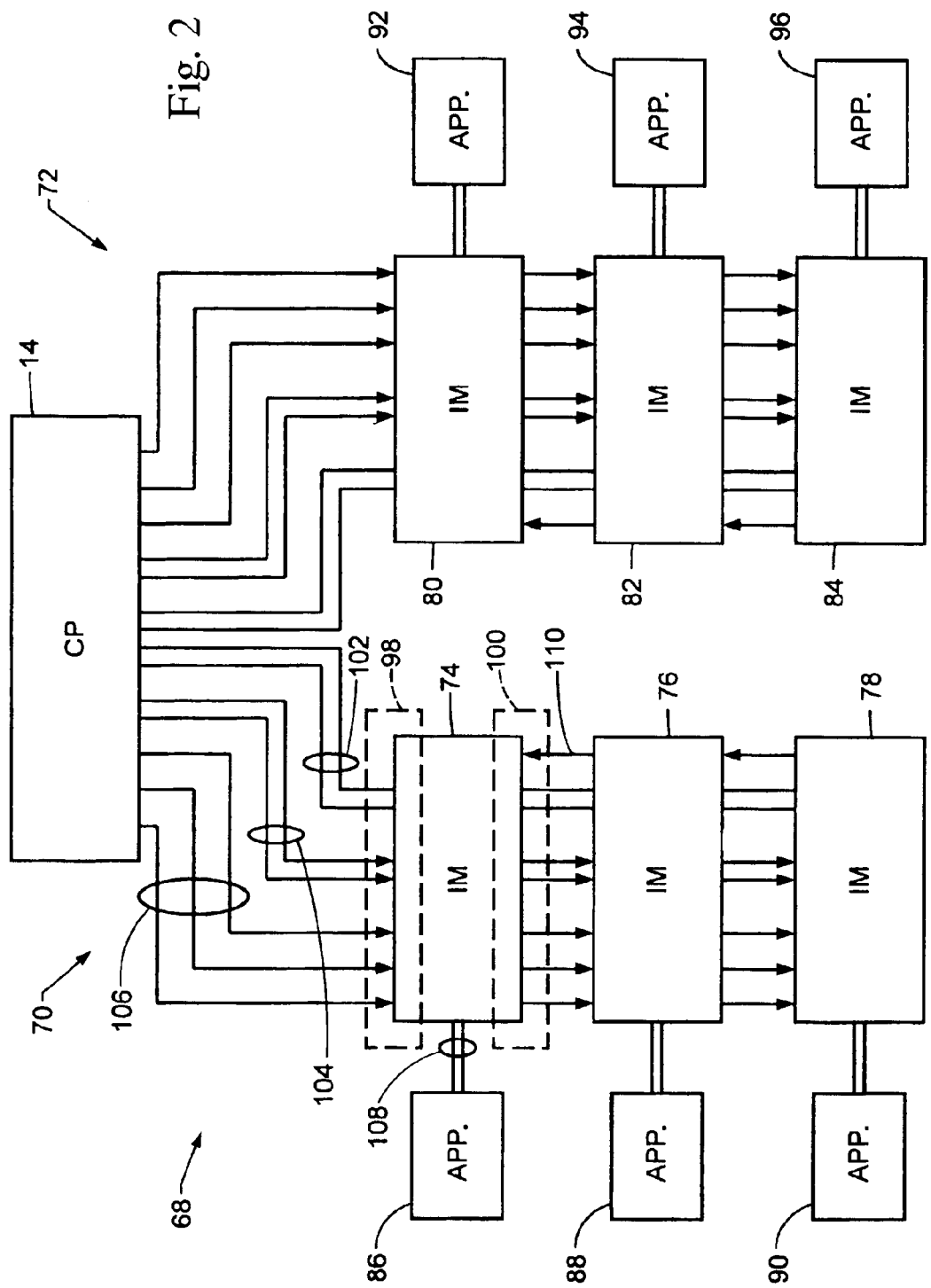
FIG. 2 is a block diagram of a controller area network for communicating control signals to and from the electronic devices, in accordance with the present invention.

Referring now to FIG. 2, a more detailed illustration of CAN network 68 is provided. Segmented CAN network 68 has a first segment 70 and a second segment 72. Unlike a standard CAN implementation having a single daisy-chained bus that would connect CP 14 to IMs 74, 76, 78, 80, 82, 84 the segment CAN of the present invention includes several segments or buses. However, the segmented CAN network 68 is based upon a standard CAN protocol.

In the present invention, the CAN bus is partitioned into up to eight segments. While the segmented CAN network 68 can support up to eight segments, for exploratory purposes only two are shown in FIG. 2.

In an embodiment of the present invention, each segment or bus in the segmented CAN network 68 behaves as an individual daisy-chained CAN network. Each segment in the CAN network can support at most seven IMs. Only the first two IMs on the first segment 70, $IM_0$ 74 and $IM_1$ 76 and the last IM on the first segment 70, $IM_6$ 78 are shown. Similarly, only the first two IMs on the second segment 72, $IM_7$ 80 and $IM_8$ 82 and the last IM on the second segment 72 $IM_{13}$ are shown. Each segment originates on a main processor board on CP 14 and most CAN data traffic occurs between CP 14 and an IM.

Each IM 74, 76, 78, 80, 82, 84 is connected to an appliance 86, 88, 90, 92, 94, 96, respectively. Further, each IM has an input connector 98 and an output connector 100 as shown on $IM_0$ 74. The input connector 98 and output connector 100 are keyed to prevent incorrect placement on the IM.

CAN network 68 of the present invention is an eight-wire CAN network having a twisted pair of data wires 102, two wires for power and ground 104, three conductors 106 for addressing of each IM, and one wire for bus termination 110. Each appliance employs an interface 108 to its corresponding IM. The interface employed varies depending upon the type of appliance being used.

The segment power and ground 104 are used to supply power to only the IM's CAN transceiver and associated circuitry, not to the rest of the IM. By isolating the interface modules 108 from the appliances (such as to high-powered radios and other noise sources), noise and ground loops are controlled.

Figure 3:
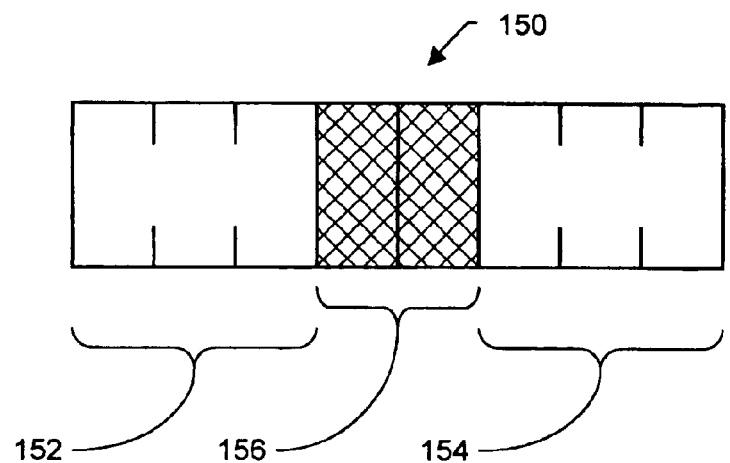
FIG. 3 is diagrammatical representation of a device identifier memory space for an interface module, in accordance with the present invention.

A unique ID 150, as shown in FIG. 3, is assigned to each IM 74, 76, 78, 80, 82, 84 attached to the segmented CAN network 68 by using the three wires for addressing each IM 106. For example, CP 14 sends a signal representing a unique ID 150 down the first segment 70 to IM 74. IM 74 assigns itself the unique ID 150, increments the ID by one, and passes it along to IM 76. IM 76 assigns itself the incremented unique ID 150, increments the ID a second time, and passes the twice incremented unique ID to the next IM. This process continues until the last IM on first segment 70, $IM_6$ 78, assigns itself a final unique ID for the first segment 70. Assignment of unique IDs is completed without intervention of the IM processor so that an IM failure does not implement addressing incorrectly. In an embodiment of the present invention ID 150 is a generated 8 bit value and is based on the combination of a segment ID 152 and the daisy chain position ID 154 of interface module relative to the hub. A pair of unused bits 156 separate segment ID portion 152 and module position portion 154. The unused bits 156 may be used for expanding either the number of segments or the daisy chain portion of ID 150. Advantageously node ID 150 is limited in size to make it possible to do an exhaustive search of all possible values within a reasonable time.

Segment ID 152 is based on which segment an IM 28 is plugged into. IM's 28 on a segment receive the segment ID 152 as a broadcast message from central processor 14.

Daisy chain ID 154 is accomplished using three signals which are passed from one IM to the next. As the signals are passed, the value of the ID 154 is automatically incremented starting with zero at the hub through 6 at the last IM. An ID 154 value of seven is considered invalid and the module will indicate an error.

After the last IM on a segment is assigned a unique ID, the CAN bus is automatically terminated. Each IM sends a signal over bus termination wire 110 searching for another IM. If an IM is not located, the IM assumes it is the last IM on the segment and terminates the bus. Similar to the assignment of unique IDs, automatic bus termination is completed without intervention of the IM processor so that an IM failure does not implement bus termination incorrectly.

Figure 4:
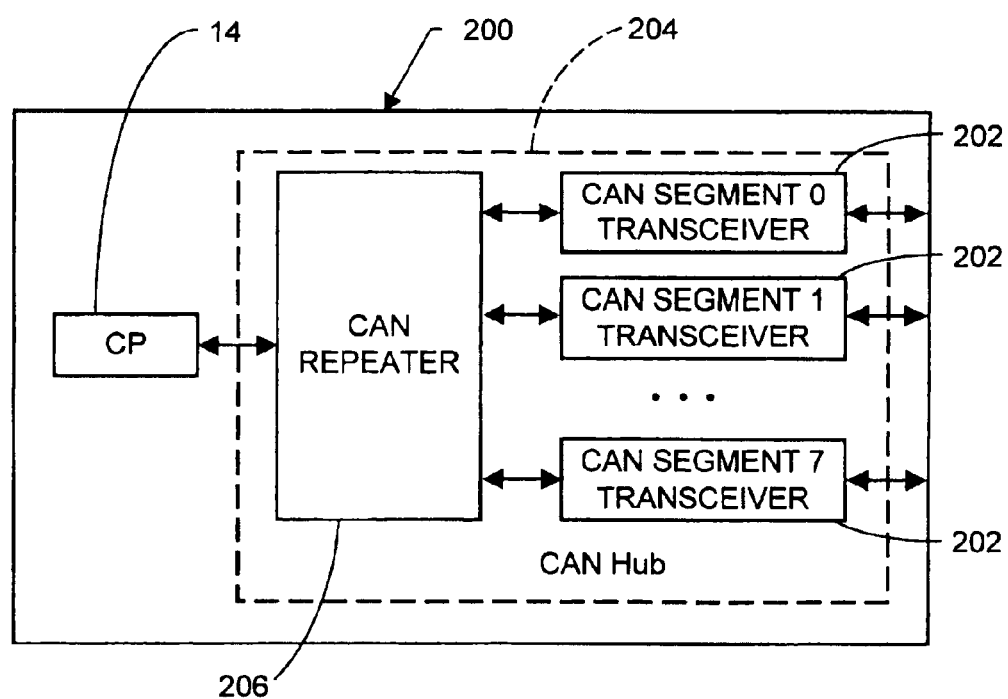
FIG. 4 is a block diagram illustrating a full implementation of the segmented CAN network in an embodiment of the present invention.
Figure 5:
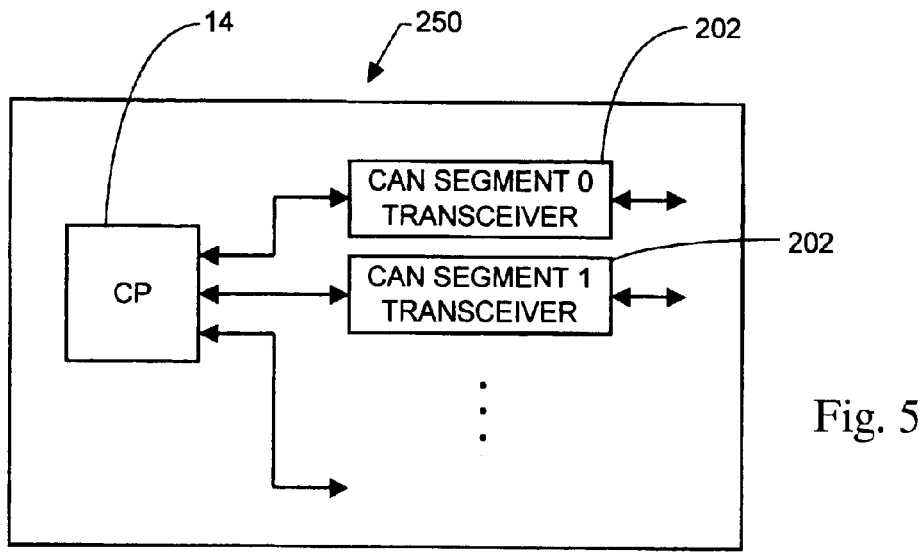
FIG. 5 is a block diagram illustrating a low-cost implementation of the segmented CAN network in another embodiment of the present invention.

With reference to FIGS. 4 and 5, the present invention contemplates at least two types of segmented CAN networks 16 (1) a full system 200 (as shown in FIG. 2) and (2) a low cost system (as shown in FIG. 4). Full system 200 may support eight segments 202 of at most seven IMs per segment for a total of fifty-six IMs. The low-cost system 250 may support at most twenty-one IMs on three segments of seven IMs each. The full implementation of the segmented CAN 200 includes a hub 204. Hub 204 is a multi-segmented repeater connecting segments 202 to each other. Hub 204 links to CP 14 for both communication and control purposes. CP 14 attaches to an internal bus of hub 204 making CP 14 a node on the CAN network. As such, CP 14 is not part of any of the segments and does not need transceivers. CP 14 can enable or disable any of the segments 202. When a segment 202 is disabled, network traffic is blocked to and from the segment. During normal operation, segments 202 are enabled. During initialization, however, CP 14 may talk to each segment 202 independently to determine which devices are attached and to verify the operation of each segment 202.

Low cost implementation of segmented CAN network 250 is illustrated in FIG. 4. Accordingly, the most significant difference between low cost implementation 250 and full implementation 200 is that the low cost implementation eliminates hub 204. Instead of hub 204 CP 14 manages the set of CAN segments directly. The number of CAN segments is limited by the number of CAN controllers built into the CP chip (i.e. 34 the MPC-565 microcontroller). Further, the low cost implementation 250 precludes messages sent on one CAN segment 202 from being seen by devices on other CAN segments. CP 14, of course, sees all of the messages.

Hub 204 further includes a CAN repeater 206 in communication with the plurality of CAN segments 202 and CP 14.

Figure 6:
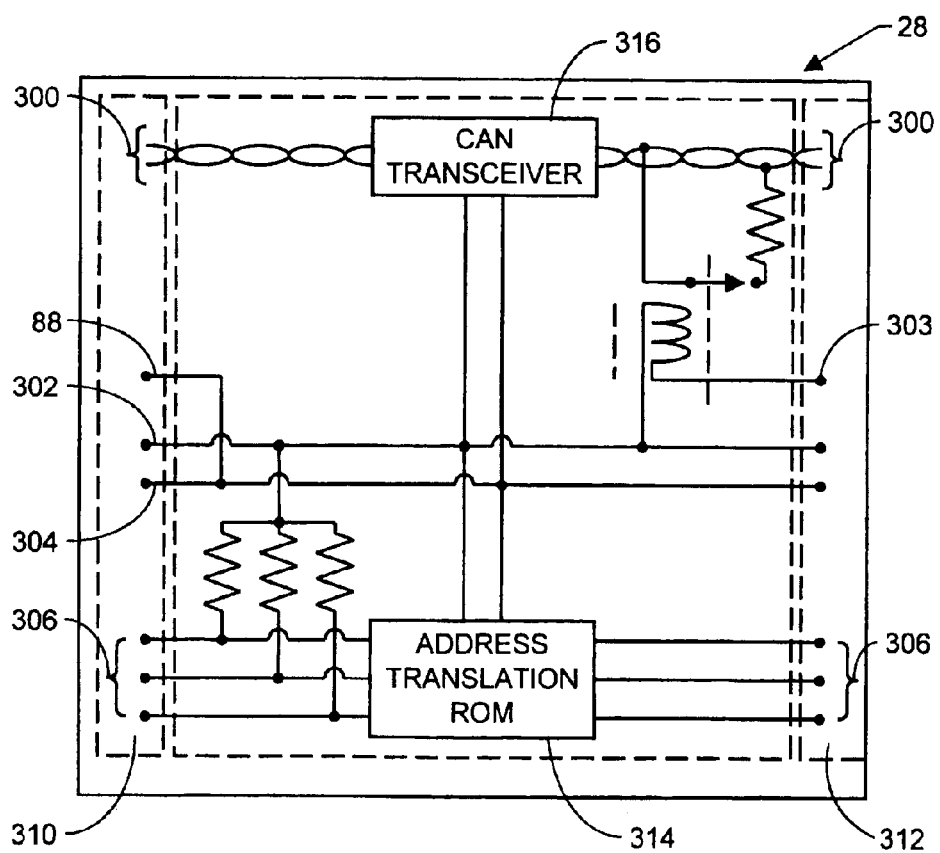
FIG. 6 is a block diagram illustrating a an interface module in detail, in accordance with the present invention.

Referring now to FIG. 6, an interface module 28 is schematically represented, in accordance with the present invention. Interface module 28 utilizes eight wires. These wires include two CAN network signal wires 300, a power and ground wire 302 and 304, three signal wire 306 for daisy chain addressing using the power and ground for return, and one signal wire 308 for bus termination. All IMs have network connectors, an input connector 310 and output connector 312.

Preferably, IM 28 has input and output connectors 310 and 312 which are keyed so that the connectors are not able to be swapped.

Further, IM 28 has a built-in address translation Read Only Memory (ROM) 314 that is powered by the CAN network power 302 and is responsible for computing the address for the next node of the daisy chain and detecting illegal addresses. If nothing is plugged into input connector 312, the general processor sees an invalid address and at a minimum flashes a diagnostic LED.

The CP and IMs are table driven. Each of the modules contains a micro-controller with a flash memory and EEPROM. The flash memory contains the code that runs the module; the EEPROM contains configuration information. The goal is to design a system where the code in the flash is independent of the equipment configuration in the vehicle.

In this design, all knowledge of the attached equipment is kept in tables and data structures stored in the EEPROM. The data customizes a module for the equipment that it services. In the case of the CP, the data contains all of the customization necessary to service the entire system, not just a single piece of equipment.

In an embodiment of the present invention virtual interface modules are provided. Logically, each piece of equipment is serviced by its own IM. And in some cases, the IM is actually implemented as part of the CP. This leads to the concept of a virtual IM vs. a physical IM. A virtual IM is the logical IM associated with a single piece of attached equipment; a physical IM is the actual hardware module or card that implements the IM. One physical IM may host multiple virtual IMs. In general, unless the distinction is critical, we do not include the word virtual or physical when referring to an IM in this document; we let the meaning come from the context.

In an embodiment of the present invention generic modules are provided. A generic module is a physical module before it has been initialized. At that point in time, the module could support a wide variety of equipment, but has not been customized to support any equipment. When an IM is initialized, the system loads data into the module's EEPROM that gives the IM directions for controlling one or more specific pieces of equipment (i.e., it defines the virtual IMs hosted by the physical IM). At that point, the IM changes from a generic module to a custom module for a specific model of light bar, or siren, or etc. The system supports two generic module types, one for discrete I/O and the other for serial ports. The discrete I/O generic module is used to support relay-driven equipment (e.g., some models of light bars, sirens, gun lock, etc.). The serial I/O generic module is used to support data driven equipment (e.g., other models of light bars, two-way radios, etc.).

Figure 7:
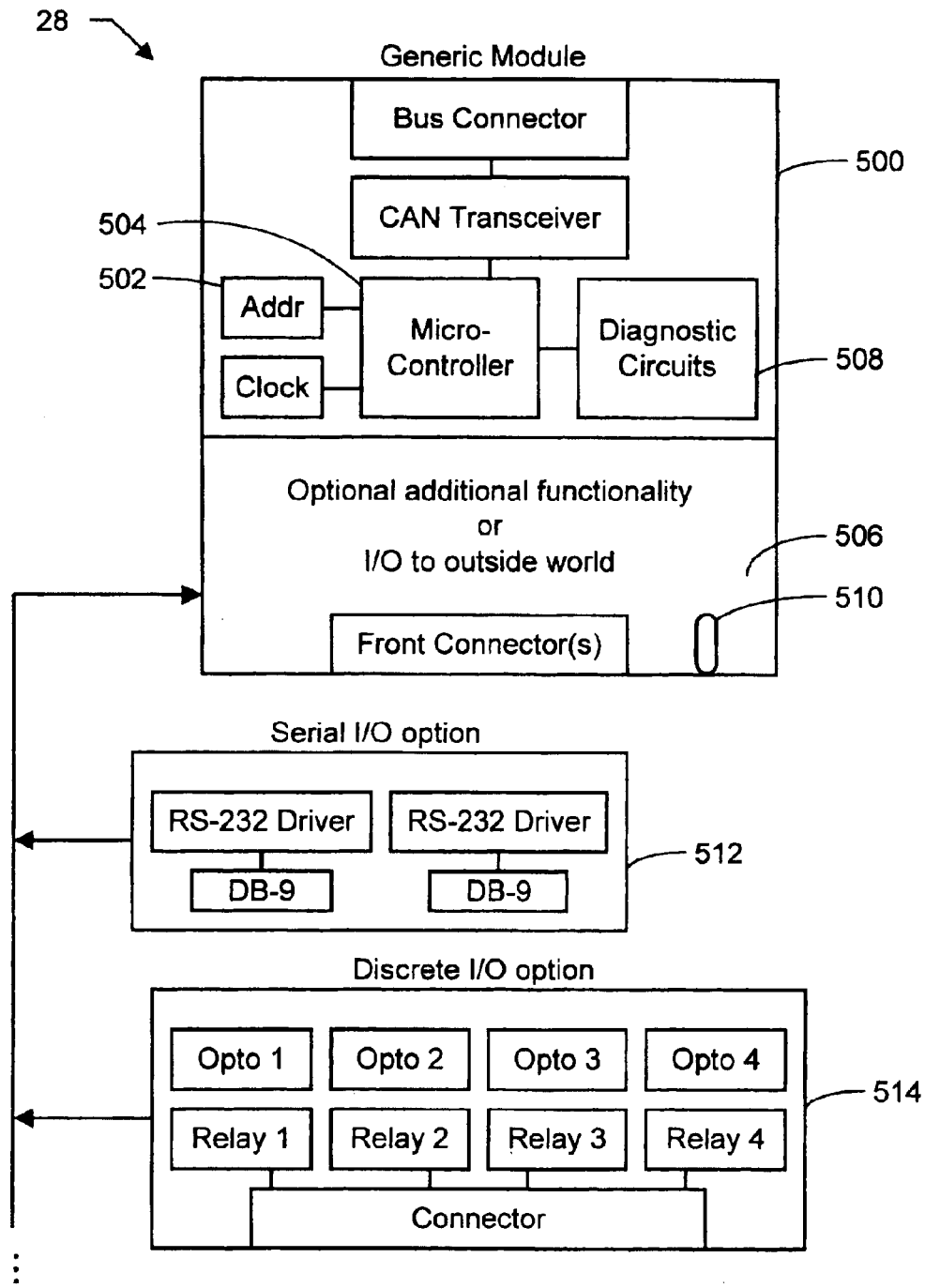
FIG. 7 is a block diagram illustrating a basic interface module design along with typical options that can be added to the interface module to customize the interface module for a specific purpose, in accordance with the present invention.

FIG. 7, shows the basic IM 28 design along with typical options. The options can be added to an IM to customize IM 28 for a specific purpose. The generic portion 500 of IM 28 provides access to the CAN network (including the address mapping) 502, a micro-controller 504, and the necessary supporting circuitry 506. Generic portion 500 also includes diagnostic circuitry 508 and a status LED 510, which are explained hereinafter.

The two optional blocks 512 and 514 shown in FIG. 7, are possible functions that can be added to the basic IM design (only one per IM type). They are for illustration only, many other functions can be added. Optional block 512 is a serial I/O block and optional block 514 is a is a serial I/O block. As shown, only a small amount of additional circuitry is needed to customize the basic IM design.

Each module type is preprogrammed to respond and send CAN messages with a given set of CAN message IDs. The messages are distinct for each module type. When more than one module of a type may exist in a system, each message ID (sent or received) is modified by incorporating the physical address of the module into the message ID. The ability for the CP to talk to each module unambiguously is central to the plug and play feature of the system.

The system CAN message set divide into four main categories:

Download messages—sent by the CP to download configuration information and executable code to the IMs. Not all IMs require this function;

Initialization messages—the communication between the CP and the IMs to synchronize the processors when one or the other first boots up;

Heartbeat messages—the communication between the CP and the IMs to monitor each other's state;

Diagnostic messages—the communication between the CP and the IMs to recover from failures; and Equipment Management messages—the commands between the CP and the IMs to control the attached equipment, to receive input from input devices, and to receive status from the equipment.

The CP sends handshake messages to each module on a regular basis. The receiving module is expected to reply to the message with its own handshake message. If a module stops receiving handshake messages from the CP, it flashes its status LED, telling the world that it is up but that it has lost communication with the main processor.

Similarly, the CP can detect that a module has stopped working (or that the CAN bus is damaged), when the control processor stops receiving responses to handshake messages sent to the module The present invention has many benefits and advantages over the prior art. For example, the little boxes architecture of the present invention has a number of benefits: 1) each of the boxes is relatively simple, and therefore straightforward to design and inherently easier to debug; 2) the Windows system is used without significant modification to either the hardware or the software allowing easy upgrades in the future; 3) the system is flexible, a user can install a set of modules that meets his needs, without installing hardware he does not need; 4) the system lends itself to plug and play; 5) customized modules can be created for common varieties of external equipment, eliminating the need for fleet maintenance to tell the system what is installed; 6) Most of the hardware resides in the trunk, not the passenger compartment. This frees us to change the form-factor of the passenger compartment equipment (e.g., the display) and opens up new mounting/location options; 7) easy-to-change modules improve serviceability; It should be possible to put self-tests in most of the modules, which could then indicate status via an LED on the front of each module; 8) the system is easy to update with new features and to support new equipment, without requiring the customer to replace the entire system at once; and 9) vehicle wiring is simplified by using a network to connect together all of the equipment.

As any person skilled in the art of systems and methods for communicating control and data signals to and from various appliances in an automobile will recognize from the previous detailed description and from the figures and claims, modifications and changes can be made to the preferred embodiments of the invention without departing from the scope of this invention defined in the following claims.

What is claimed is:

1. A system for controlling a plurality of electronic devices in an automobile, the system comprising:
   a processor;
   a communication medium in communication with the processor, the communications medium being divided into a plurality of segments, each of the plurality of segments is connected directly to the processor; and
   a plurality of interface modules, each of the plurality of interface modules connected to the processor by at least one of the plurality of segments, and
   wherein the plurality of interface modules communicate control messages to the plurality of electronic devices, and
   wherein the processor is configured to execute program code to assign a segment identifier and a module identifier to uniquely identify each of the plurality of segments and each of the plurality of interface modules.

2. The system of claim 1, wherein at least one of the plurality of interface modules is a serial driver interface module.

3. The system of claim 1, wherein at least one of the plurality of interface modules is a relay output interface module.

4. The system of claim 1, wherein at least one of the plurality of interface modules is a vehicle status interface module for monitoring the operating status of the automobile.

5. The system of claim 1, wherein the communications medium is a segmented controller area network.

6. The system of claim 1, wherein the plurality of interface modules further comprises a controller area network transceiver and a computer memory.

7. The system of claim 6, wherein the computer memory further comprises EEPROM.

8. The system of claim 1, further comprising a human machine interface in communication with the processor.

9. The system of claim 8, wherein the human machine interface is a switch module.

10. The system of claim 8, wherein the human machine interface is a fingerprint reader.

11. The system of claim 8, wherein the human machine interface is a head up display.

12. The system of claim 8, wherein the human machine interface is a liquid crystal display.

13. The system of claim 1, wherein the communications medium further comprise a hub for connecting the plurality of segments to each other.

14. The system of claim 13, wherein the hub is a multi-segmented repeater in communication with the processor.

15. The system of claim 1, further comprising a database in communication with the processor for communicating device specific control information to the plurality of interface modules.

16. A method for controlling a plurality of electronic devices in an automobile, the method comprising:
   generating control signals using a processor;
   transmitting the control signals over a communications medium in communication with the processor;
   receiving the control signals with a plurality of interface modules in communication with the communications medium, the communications medium being divided into a plurality of segments, each of the plurality of segments is connected to the processor and each of the plurality of interface modules is connected to the processor by at least one of the plurality of segments;
   assigning a segment identifier to uniquely identify each of the plurality of segments;
   assigning a module identifier to uniquely identify each of the plurality of interface modules; and
   controlling the plurality of electronic devices by communicating the control signals through the plurality of interface modules in communicate with each of the plurality of electronic devices.

17. The method of claim 16, further comprising providing a serial driver interface module for controlling a serial device.

18. The method of claim 16, further comprising providing a relay output interface module for controlling a plurality of electronic devices having relays.

19. The method of claim 16, further comprising monitoring the operating status of the automobile using a vehicle status interface module.

20. The method of claim 16, further comprising communicating device specific control information to the plurality of interface modules wherein the device specific control information is stored in a database in communication with the processor.

21. A system for controlling a plurality of electronic devices in an automobile, the system comprising:
   a processor;
   a communications means in communication with the processor, the communications means being divided into a plurality of segments, each of the plurality of segments is connected directly to the processor; and
   a plurality of interface modules, each of the plurality of interface modules connected to the processor by at least one at the plurality of segments, and
   wherein the plurality of interface modules communicate control messages to the plurality of electronic devices and
   wherein the processor assigns a segment identifier to uniquely identify each of the plurality of segments; and
   wherein the processor assigns a segment identifier to uniquely identify each of the plurality of interface modules.

22. The system of claim 21, wherein at least one of the plurality of interface modules is a serial driver interface module.

23. The system of claim 21, wherein at least one of the plurality of interface modules is a relay output interface module.

24. The system of claim 21, wherein at least one of the plurality of interface modules is a vehicle status interface module for monitoring the operating status of the automobile.

25. The system of claim 21, wherein the communications means is a segmented controller area network.

26. The system of claim 21, wherein the plurality of interface modules further comprises a controller area network transceiver and a computer memory.

27. The system of claim 26, wherein the computer memory further comprises EEPROM.

28. The system of claim 21, further comprising a human machine interface in communication with the processor.

29. The system of claim 28, wherein the human machine interface is a switch module.

30. The system of claim 28, wherein the human machine interface is a fingerprint reader.

31. The system of claim 28, wherein the human machine interface is a head up display.

32. The system of claim 28, wherein the human machine interface is a liquid crystal display.

33. The system of claim 28, wherein the communications means further comprise a hub for connecting the plurality of segments to each other.

34. The system of claim 33, wherein the hub is a multi-segmented repeater in communication with the processor.

35. The system of claim 21, further comprising a database in communication with the processor for communicating device specific control information to the plurality of interface modules.

* * * * *